(12) United States Patent
Chen et al.

(10) Patent No.: US 11,474,636 B2
(45) Date of Patent: Oct. 18, 2022

(54) SYNCHRONIZATION METHOD, WIRELESS COMMUNICATION CHIP, TOUCH CONTROL CHIP, AND DRIVING CHIP

(71) Applicant: SHENZHEN GOODIX TECHNOLOGY CO., LTD., Shenzhen (CN)

(72) Inventors: Xianpeng Chen, Shenzhen (CN); Hai Li, Shenzhen (CN); Jintao Liu, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/483,561

(22) Filed: Sep. 23, 2021

(65) Prior Publication Data
US 2022/0011916 A1 Jan. 13, 2022

Related U.S. Application Data

(63) Continuation of application No. PCT/CN2020/093982, filed on Jun. 2, 2020.

(51) Int. Cl.
*G06F 3/044* (2006.01)
*G06F 3/041* (2006.01)

(52) U.S. Cl.
CPC ........ *G06F 3/04162* (2019.05); *G06F 3/0441* (2019.05); *G06F 3/0442* (2019.05); *G06F 2203/04114* (2019.05)

(58) Field of Classification Search
CPC .. G06F 3/04162; G06F 3/0441; G06F 3/0442; G06F 3/03545; G06F 2203/04114
See application file for complete search history.

(56) References Cited

U.S. PATENT DOCUMENTS

| | | | |
|---|---|---|---|
| 9,977,517 B2 | 5/2018 | Kim | |
| 10,324,547 B2 * | 6/2019 | Han | ................... G06F 3/04166 |
| 10,698,506 B2 | 6/2020 | Kim | |
| 2016/0116997 A1 | 4/2016 | Kim | |

(Continued)

FOREIGN PATENT DOCUMENTS

| | | |
|---|---|---|
| CN | 105549766 A | 5/2016 |
| CN | 110832447 A | 2/2020 |

(Continued)

*Primary Examiner* — Lisa S Landis

(57) ABSTRACT

The present application provides a synchronization method. The method includes: transmitting, by a first wireless communication chip of the electronic device, a synchronization signal to a second wireless communication chip of the active pen and simultaneously transmitting a first indication signal to a touch control chip of the touch screen; where the first indication signal is used to instruct the touch control chip to detect a driving signal transmitted by the active pen after from reception of the first indication signal, the second wireless communication chip is further configured to transmit a second indication signal to a driving chip of the active pen while receiving the synchronization signal, the second indication signal is used to instruct the driving chip to transmit the driving signal after from reception of the second indication signal, the second preset duration is less than the first preset duration.

19 Claims, 7 Drawing Sheets

(56) References Cited

U.S. PATENT DOCUMENTS

| | | | |
|---|---|---|---|
| 2017/0192549 A1* | 7/2017 | Katayama | G06F 3/041 |
| 2018/0129311 A1* | 5/2018 | Westhues | G06F 3/04162 |
| 2018/0239451 A1 | 8/2018 | Kim | |
| 2018/0260077 A1* | 9/2018 | Westhues | G06F 3/04182 |

FOREIGN PATENT DOCUMENTS

| | | |
|---|---|---|
| CN | 110959150 A | 4/2020 |
| CN | 111124158 A | 5/2020 |
| KR | 20170015648 A | 2/2017 |

* cited by examiner

SYNCHRONIZATION METHOD, WIRELESS COMMUNICATION CHIP, TOUCH CONTROL CHIP, AND DRIVING CHIP

CROSS-REFERENCE TO RELATED APPLICATIONS

This application is a continuation of International Application No. PCT/CN2020/093982, filed on Jun. 2, 2020, the disclosure of which is hereby incorporated by reference in its entirety.

TECHNICAL FIELD

Embodiments of the present application relate to the field of information technologies, and in particular, to a synchronization method, a wireless communication chip, a touch control chip, and a driving chip.

BACKGROUND

With the popularization of capacitive screens and active pens, the application of a capacitive active pen has become increasingly widespread. A protocol between an active pen and a touch screen is also evolving, and a development trend thereof has evolved from one-way communication at an early stage to two-way communication at present. However, no matter what protocol is adopted, a connection between the touch screen and the active pen is established according to a transmission and reception time sequence and a period of a signal agreed in the protocol, so as to realize collection of a coordinate signal of the active pen by the touch screen and realize a writing function of the active pen. Therefore, a working premise of the active pen is to perform time-sequence synchronization between the active pen and the touch screen to establish a connection. Thus, how to effectively realize synchronization between a touch screen and an active pen has become an urgent problem to be solved.

SUMMARY

Embodiments of the present application provide a synchronization method, a wireless communication chip, a touch control chip, and a driving chip, which could effectively realize synchronization between a touch screen and an active pen.

In a first aspect, a synchronization method is provided, the method is used for synchronization between a touch screen of an electronic device and an active pen, and the method includes:

transmitting, by a first wireless communication chip of the electronic device, a synchronization signal to a second wireless communication chip of the active pen and simultaneously transmitting a first indication signal to a touch control chip of the touch screen;

where the first indication signal is used to instruct the touch control chip to detect a driving signal transmitted by the active pen after a first preset duration starting from reception of the first indication signal, the second wireless communication chip is further configured to transmit a second indication signal to a driving chip of the active pen while receiving the synchronization signal, the second indication signal is used to instruct the driving chip to transmit the driving signal after a second preset duration starting from reception of the second indication signal, the second preset duration is less than the first preset duration, and a difference value between the second preset duration and the first preset duration is within a preset range.

In a possible implementation manner, the difference value between the second preset duration and the first preset duration is determined based on a wireless transmission delay between the first wireless communication chip and the second wireless communication chip.

In a possible implementation manner, the preset range is 100 microseconds to 200 microseconds.

In a possible implementation manner, the method further includes: receiving, by the first wireless communication chip, a response message transmitted by the second wireless communication chip for the synchronization signal.

In a possible implementation manner, the first wireless communication chip is connected to the touch control chip through pins, and the transmitting, by the first wireless communication chip, the first indication signal to the touch control chip of the touch screen includes: outputting, by the first wireless communication chip, the first indication signal to a pin corresponding to the touch control chip through a pin of the first wireless communication chip.

In a possible implementation manner, the synchronization signal is transmitted periodically.

In a possible implementation manner, the first wireless communication chip and the second wireless communication chip are Bluetooth low energy (BLE) chips.

In a second aspect, a synchronization method is provided, the method is used for synchronization between a touch screen of an electronic device and an active pen, and the method includes:

receiving, by a touch control chip of the touch screen, a first indication signal transmitted by a first wireless communication chip of the electronic device, where the first indication signal is transmitted at the same time when the first wireless communication chip transmits a synchronization signal to a second wireless communication chip of the active pen; and detecting, by the touch control chip, a driving signal transmitted by the active pen after a first preset duration starting from reception of the first indication signal;

where the second wireless communication chip is further configured to transmit a second indication signal to a driving chip of the active pen while receiving the synchronization signal, the second indication signal is used to instruct the driving chip to transmit the driving signal after a second preset duration starting from reception of the second indication signal, the second preset duration is less than the first preset duration, and a difference value between the second preset duration and the first preset duration is within a preset range.

In a possible implementation manner, the difference value between the second preset duration and the first preset duration is determined based on a wireless transmission delay between the first wireless communication chip and the second wireless communication chip.

In a possible implementation manner, the preset range is 100 microseconds to 200 microseconds.

In a possible implementation manner, the first wireless communication chip is connected to the touch control chip through pins, and the receiving, by the touch control chip of the touch screen, the first indication signal transmitted by the first wireless communication chip of the electronic device includes: receiving, by the touch control chip, the first indication signal output by a pin corresponding to the first wireless communication chip through a pin of the touch control chip.

In a possible implementation manner, the synchronization signal is transmitted periodically.

In a possible implementation manner, the first wireless communication chip and the second wireless communication chip are BLE chips.

In a third aspect, a synchronization method is provided, the method is used for synchronization between a touch screen of an electronic device and an active pen, and the method includes:

receiving, by a second wireless communication chip of the active pen, a synchronization signal transmitted by a first wireless communication chip of the electronic device, and transmitting a second indication signal to a driving chip of the active pen while receiving the synchronization signal;

where the second indication signal is used to instruct the driving chip to transmit a driving signal after a second preset duration starting from reception of the second indication signal, the first wireless communication chip is further configured to transmit a first indication signal to a touch control chip of the touch screen while transmitting the synchronization signal, the first indication signal is used to instruct the touch control chip to detect the driving signal after a first preset duration starting from reception of the first indication signal, the second preset duration is less than the first preset duration, and a difference value between the second preset duration and the first preset duration is within a preset range.

In a possible implementation manner, the difference value between the second preset duration and the first preset duration is determined based on a wireless transmission delay between the first wireless communication chip and the second wireless communication chip.

In a possible implementation manner, the preset range is 100 microseconds to 200 microseconds.

In a possible implementation manner, the method further includes:

transmitting, by the second wireless communication chip, a response message for the synchronization signal to the first wireless communication chip while transmitting the second indication signal to the driving chip.

In a possible implementation manner, the second wireless communication chip is connected to the driving chip through pins, and the transmitting, by the second wireless communication chip, the second indication signal to the driving chip of the active pen includes: outputting, by the second wireless communication chip, the second indication signal to a pin corresponding to the driving chip through a pin of the second wireless communication chip.

In a possible implementation manner, the synchronization signal is transmitted periodically.

In a possible implementation manner, the first wireless communication chip and the second wireless communication chip are BLE chips.

In a fourth aspect, a synchronization method is provided, the method is used for synchronization between a touch screen of an electronic device and an active pen, and the method includes:

receiving, by a driving chip of the active pen, a second indication signal transmitted by a second wireless communication chip of the active pen, where the second indication signal is transmitted at the same time when the second wireless communication chip receives a synchronization signal transmitted by a first wireless communication chip of the electronic device; and transmitting, by the driving chip, a driving signal after a second preset duration starting from reception of the second indication signal;

where the first wireless communication chip is further configured to transmit a first indication signal to a touch control chip of the touch screen while transmitting the synchronization signal, the first indication signal is used to instruct the touch control chip to detect the driving signal after a first preset duration starting from reception of the first indication signal, the second preset duration is less than the first preset duration, and a difference value between the second preset duration and the first preset duration is within a preset range.

In a possible implementation manner, the difference value between the second preset duration and the first preset duration is determined based on a wireless transmission delay between the first wireless communication chip and the second wireless communication chip.

In a possible implementation manner, the preset range is 100 microseconds to 200 microseconds.

In a possible implementation manner, the second wireless communication chip is connected to the driving chip through pins, and the receiving, by the driving chip of the active pen, the second indication signal transmitted by the second wireless communication chip of the active pen includes: receiving, by the driving chip, the second indication signal output by a pin corresponding to the second wireless communication chip through a pin of the driving chip.

In a possible implementation manner, the synchronization signal is transmitted periodically.

In a possible implementation manner, the first wireless communication chip and the second wireless communication chip are BLE chips.

In a fifth aspect, a wireless communication chip is provided, the wireless communication chip is a first wireless communication chip, the first wireless communication chip is disposed in an electronic device and configured for synchronization between a touch screen of the electronic device and an active pen, and the first wireless communication chip includes:

a processing module, configured to generate a synchronization signal and a first indication signal; and a transmitting module, configured to transmit the synchronization signal to a second wireless communication chip of the active pen and simultaneously transmit the first indication signal to a touch control chip of the touch screen;

where the first indication signal is used to instruct the touch control chip to detect a driving signal transmitted by the active pen after a first preset duration starting from reception of the first indication signal, the second wireless communication chip is further configured to transmit a second indication signal to a driving chip of the active pen while receiving the synchronization signal, the second indication signal is used to instruct the driving chip to transmit the driving signal after a second preset duration starting from reception of the second indication signal, the second preset duration is less than the first preset duration, and a difference value between the second preset duration and the first preset duration is within a preset range.

In a possible implementation manner, the difference value between the second preset duration and the first preset duration is determined based on a wireless transmission delay between the first wireless communication chip and the second wireless communication chip.

In a possible implementation manner, the preset range is 100 microseconds to 200 microseconds.

In a possible implementation manner, the chip further includes: a receiving module, configured to receive a response message transmitted by the second wireless communication chip for the synchronization signal.

In a possible implementation manner, the transmitting module is configured to: output the first indication signal to a pin corresponding to the touch control chip through a pin of the first wireless communication chip.

In a possible implementation manner, the synchronization signal is transmitted periodically.

In a possible implementation manner, the first wireless communication chip and the second wireless communication chip are BLE chips.

In a sixth aspect, a touch control chip is provided, the touch control chip is disposed in an electronic device and configured for synchronization between a touch screen of the electronic device and an active pen, and the touch control chip includes:

a receiving module, configured to receive a first indication signal transmitted by a first wireless communication chip of the electronic device, where the first indication signal is transmitted at the same time when the first wireless communication chip transmits a synchronization signal to a second wireless communication chip of the active pen; and a detection module, configured to detect a driving signal transmitted by the active pen after a first preset duration starting from reception of the first indication signal by the receiving module;

where the second wireless communication chip is further configured to transmit a second indication signal to a driving chip of the active pen while receiving the synchronization signal, the second indication signal is used to instruct the driving chip to transmit the driving signal after a second preset duration starting from reception of the second indication signal, the second preset duration is less than the first preset duration, and a difference value between the second preset duration and the first preset duration is within a preset range.

In a possible implementation manner, the difference value between the second preset duration and the first preset duration is determined based on a wireless transmission delay between the first wireless communication chip and the second wireless communication chip.

In a possible implementation manner, the preset range is 100 microseconds to 200 microseconds.

In a possible implementation manner, the receiving module is configured to: receive the first indication signal output by a pin corresponding to the first wireless communication chip through a pin of the touch control chip.

In a possible implementation manner, the synchronization signal is transmitted periodically.

In a possible implementation manner, the first wireless communication chip and the second wireless communication chip are BLE chips.

In a seventh aspect, a wireless communication chip is provided, the wireless communication chip is a second wireless communication chip, the second wireless communication chip is disposed in an active pen and configured for synchronization between a touch screen of an electronic device and the active pen, and the second wireless communication chip includes:

a receiving module, configured to receive a synchronization signal transmitted by a first wireless communication chip of the electronic device; and a transmitting module, configured to transmit a second indication signal to a driving chip of the active pen while the receiving module receives the synchronization signal;

where the second indication signal is used to instruct the driving chip to transmit a driving signal after a second preset duration starting from reception of the second indication signal, the first wireless communication chip is further configured to transmit a first indication signal to a touch control chip of the touch screen while transmitting the synchronization signal, the first indication signal is used to instruct the touch control chip to detect the driving signal after a first preset duration starting from reception of the first indication signal, the second preset duration is less than the first preset duration, and a difference value between the second preset duration and the first preset duration is within a preset range.

In a possible implementation manner, the difference value between the second preset duration and the first preset duration is determined based on a wireless transmission delay between the first wireless communication chip and the second wireless communication chip.

In a possible implementation manner, the preset range is 100 microseconds to 200 microseconds.

In a possible implementation manner, the transmitting module is further configured to: transmit, by the second wireless communication chip, a response message for the synchronization signal to the first wireless communication chip while transmitting the second indication signal to the driving chip.

In a possible implementation manner, the transmitting module is configured to: output the second indication signal to a pin corresponding to the driving chip through a pin of the second wireless communication chip.

In a possible implementation manner, the synchronization signal is transmitted periodically.

In a possible implementation manner, the first wireless communication chip and the second wireless communication chip are BLE chips.

In an eighth aspect, a driving chip is provided, the driving chip is disposed in an active pen and configured for synchronization between a touch screen of an electronic device and the active pen, and the driving chip includes:

a receiving module, configured to receive a second indication signal transmitted by a second wireless communication chip of the active pen, where the second indication signal is transmitted at the same time when the second wireless communication chip receives a synchronization signal transmitted by the first wireless communication chip; and a driving module, configured to transmit a driving signal after a second preset duration starting from reception of the second indication signal;

where the first wireless communication chip is further configured to transmit a first indication signal to a touch control chip of the touch screen while transmitting the synchronization signal, the first indication signal is used to instruct the touch control chip to detect the driving signal after a first preset duration starting from reception of the first indication signal, the second preset duration is less than the first preset duration, and a difference value between the second preset duration and the first preset duration is within a preset range.

In a possible implementation manner, the difference value between the second preset duration and the first preset duration is determined based on a wireless transmission delay between the first wireless communication chip and the second wireless communication chip.

In a possible implementation manner, the preset range is 100 microseconds to 200 microseconds.

In a possible implementation manner, the receiving module is configured to: receive the second indication signal output by a pin corresponding to the second wireless communication chip through a pin of the driving chip.

In a possible implementation manner, the synchronization signal is transmitted periodically.

In a possible implementation manner, the first wireless communication chip and the second wireless communication chip are BLE chips.

In a ninth aspect, an electronic device is provided, including: the wireless communication chip according to the foregoing fifth aspect or any possible implementation manner of the fifth aspect; and the touch control chip according to the foregoing sixth aspect or any possible implementation manner of the sixth aspect.

In a tenth aspect, an active pen is provided, including: the wireless communication chip according to the foregoing seventh aspect or any possible implementation manner of the seventh aspect; and the driving chip according to the foregoing eighth aspect or any possible implementation manner of the eighth aspect.

According to the foregoing technical solutions, the synchronization between the touch screen and the active pen is realized by utilizing the first wireless communication chip of the electronic device and the second wireless communication chip of the active pen. The first wireless communication chip of the electronic device transmits the first indication signal to the touch control chip of the touch screen while transmitting the synchronization signal to the second wireless communication chip of the active pen, and the first indication signal is used to instruct the touch control chip to detect the driving signal transmitted by the active pen after the first preset duration period. The second wireless communication chip of the active pen transmits the second indication signal to the driving chip of the active pen while receiving the synchronization signal, and the second indication signal is used to instruct the driving chip to transmit the driving signal after the second preset duration. Considering a transmission delay of wireless communication, the second preset duration is less than the first preset duration, and the difference value between the second preset duration and the first preset duration is substantially constant. In this way, while the active pen transmits the driving signal, the touch screen is just detecting the driving signal, thereby realizing synchronization between the touch screen and the active pen. Since the synchronization between the touch screen and the active pen is realized by utilizing the wireless communication chip, a time delay caused by a synchronization mode of blindly detecting the driving signal by the touch screen is avoided, and the synchronization can be performed when the active pen starts to work, thus increasing a response speed of the first writing of the active pen and improving user experience.

DESCRIPTION OF EMBODIMENTS

Technical solutions of the present application are described below in combination with accompanying drawings.

Figure 1:
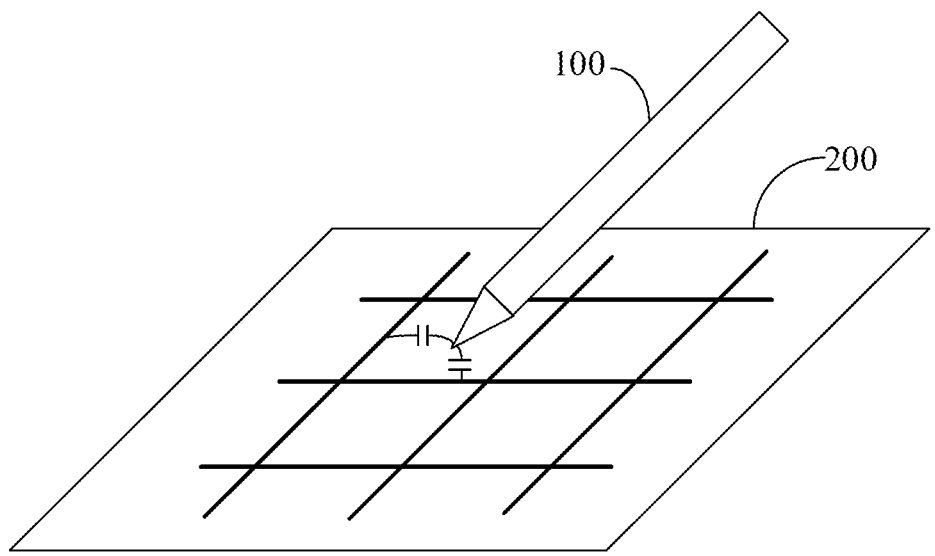
FIG. 1 is a schematic diagram of a principle of using an active pen on a touch screen.

When an active pen is actually used, a screen end needs to obtain tip coordinates of the active pen, and the screen end displays handwriting of the active pen according to the tip coordinates. For example, as shown in FIG. 1, a certain number of horizontal and vertical detection electrodes are distributed on a touch screen 200, and if a driving signal output by a tip electrode of an active pen 100 acts on a certain position of the touch screen 200, both the horizontal detection electrode and the vertical detection electrode corresponding to that position generate corresponding detection signals, so that two-dimensional position coordinates of the active pen 100 on the touch screen 200 may be calculated according to the detection signals.

The driving signal may also be referred to as a driven signal, an excitation signal, etc., and is an electrical signal transmitted by the tip electrode of the active pen for determining a tip position of the active pen.

Figure 2:
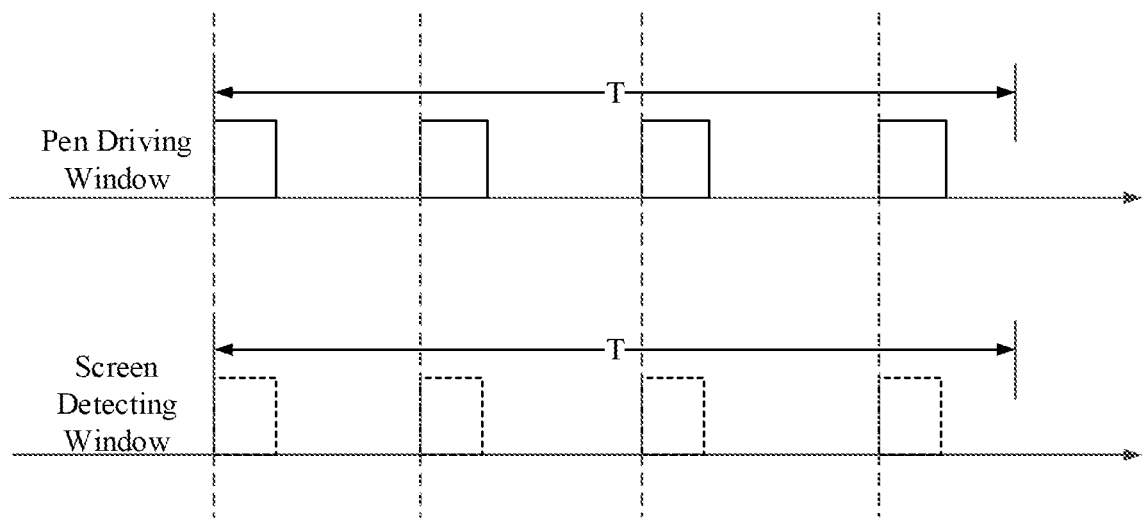
FIG. 2 is a schematic diagram of synchronization between a touch screen and an active pen.

The active pen and the touch screen are two independent systems. The touch screen does not know when the user will use the active pen to write on the touch screen, and cannot predict at which moment to start to detect the driving signal transmitted by the active pen. Therefore, time-sequence synchronization between the active pen and the touch screen shall be realized first, and synchronization needs to be maintained for a long time at the time of writing, so that the touch screen can stably and correctly detect the driving signal transmitted by the active pen, and generally a synchronization error needs to be less than 50 us. According to current protocols for an active pen, such as a Microsoft pen protocol (MPP), a universal stylus initiative (USI) protocol, etc., the touch screen needs to periodically detect the driving signal transmitted by the active pen. If the touch screen detects the driving signal transmitted by the active pen in a certain signal sampling, a detection period is started to be adjusted for performing time-sequence synchronization. For example, as shown in FIG. 2, when a period of detecting a driving signal by a touch screen is aligned with a period of transmitting a driving signal by an active pen in time sequence and a signal detection window of the touch screen is consistent with a driving window of the active pen in time sequence, synchronization between the touch screen and the active pen is realized.

However, with this synchronization method, a synchronization process between the touch screen and the active pen generally requires one or two cycles, and one cycle may usually be about 16 ms, and therefore this synchronization method introduces a certain time delay. In addition, since a height that the touch screen detects the active pen is generally required to be only 5 mm to 10 mm, that is, the tip of the active pen is pretty close to a surface of the touch screen before starting synchronization. Therefore, the synchronization process causes a certain time delay, which leads to a slower response of the first writing of the active pen and seriously affects writing experience of the user.

Therefore, the present application provides a synchronization method, which could effectively realize synchronization between an active pen and a touch screen, greatly reduce a time delay caused by a synchronization process, and improve user experience.

Figure 3:
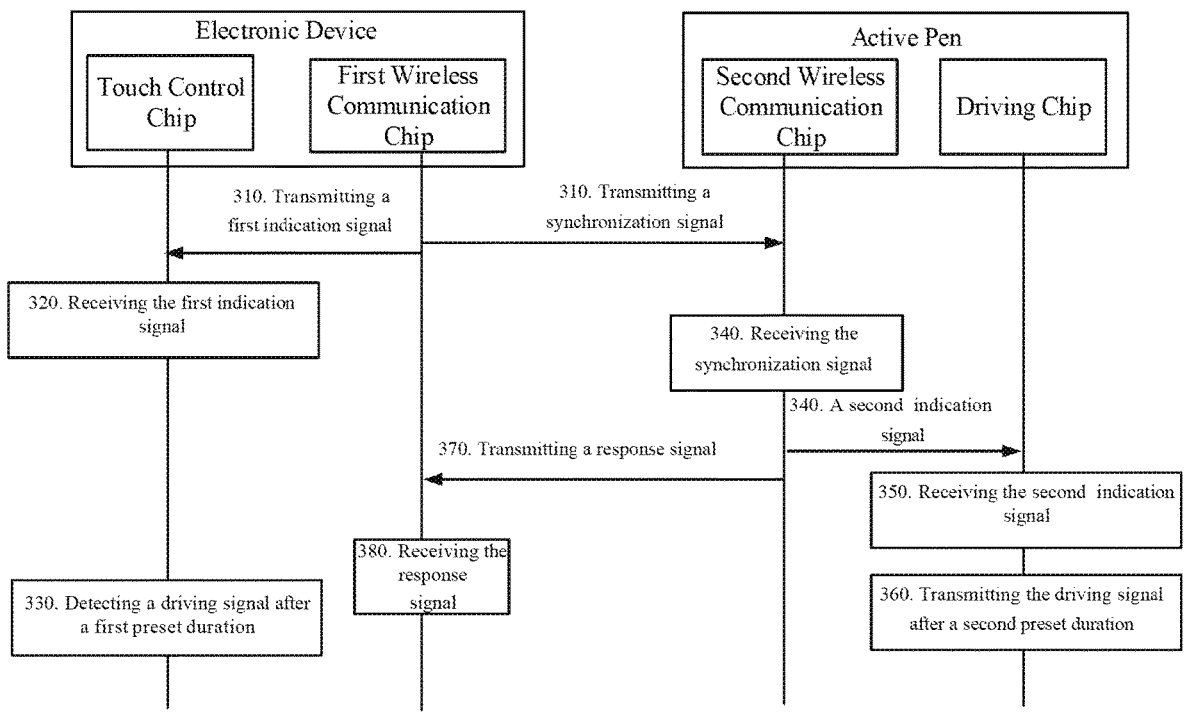
FIG. 3 is a process interaction diagram of a synchronization method according to an embodiment of the present application.

FIG. 3 is a process interaction diagram of a synchronization method according to an embodiment of the present application. A method 300 described in FIG. 3 is used for synchronization between a touch screen and an active pen of an electronic device, and the method 300 may be executed by a first wireless communication chip of the electronic device, a touch control chip corresponding to the touch screen, a second wireless communication chip of the active pen, and a driving chip of the active pen.

As shown in FIG. 3, the method 300 includes some or all of the following steps.

In 310, a first wireless communication chip transmits a synchronization signal to a second wireless communication chip and simultaneously transmits a first indication signal to a touch control chip of a touch screen.

In 320, the touch control chip receives the first indication signal transmitted by the first wireless communication chip.

In 330, the touch control chip detects a driving signal transmitted by an active pen after a first preset duration starting from reception of the first indication signal.

In 340, the second wireless communication chip receives the synchronization signal transmitted by the first wireless communication chip, and transmits a second indication signal to a driving chip while receiving the synchronization signal.

In 350, the driving chip receives the second indication signal transmitted by the second wireless communication chip.

In 360, the driving chip transmits the driving signal after a second preset duration starting from reception of the second indication signal.

According to the embodiment of the present application, the synchronization between the touch screen and the active pen is realized by utilizing wireless communication between the first wireless communication chip of the electronic device and the second wireless communication chip of the active pen.

For a screen end, the first wireless communication chip of the electronic device transmits the first indication signal to the touch control chip of the touch screen while transmitting the synchronization signal to the second wireless communication chip of the active pen, and the first indication signal is used to instruct the touch control chip to detect the driving signal transmitted by the active pen after the first preset duration period.

For a pen end, the second wireless communication chip of the active pen transmits the second indication signal to the driving chip of the active pen while receiving the synchronization signal, and the second indication signal is used to instruct the driving chip to transmit the driving signal after the second preset duration.

In this way, the first preset duration and the second preset duration are set, so that the touch screen is just detecting the driving signal while the active pen transmits the driving signal, thereby realizing synchronization between the touch screen and the active pen. Since the synchronization between the touch screen and the active pen is realized by utilizing the wireless communication chip, a time delay caused by a synchronization mode of blindly detecting the driving signal by the touch screen is avoided, and the synchronization can be performed when the active pen starts to work, thus increasing a response speed of the first writing of the active pen and improving user experience.

Considering a transmission delay of wireless communication, the second preset duration is less than the first preset duration, and the difference value between the second preset duration and the first preset duration is substantially constant.

The difference value between the second preset duration and the first preset duration may be determined, for example, based on a wireless transmission delay between the first wireless communication chip and the second wireless communication chip.

The difference value between the second preset duration and the first preset duration may be, for example, within a preset range, such as between 100 us and 200 us.

In an implementation manner, the method 300 may further include steps 370 and 380 to ensure the reliability of signal transmission.

In 370, the second wireless communication chip transmits a response message for the synchronization signal to the first wireless communication chip while transmitting the second indication signal to the driving chip.

In 380, the first wireless communication chip receives the response message transmitted by the second wireless communication chip.

In an implementation manner, the synchronization signal is transmitted periodically. In other words, the first wireless communication chip, the second wireless communication chip, the driving chip and the touch control chip may periodically perform the respective corresponding operations in the foregoing method 300. The transmission period of the synchronization signal may be, for example, 16.25 ms, or the like. Based on the synchronization signal, a driving period of the active pen and a detection period of the touch screen are constantly and automatically fine-adjusted and are always synchronized.

Figure 4:
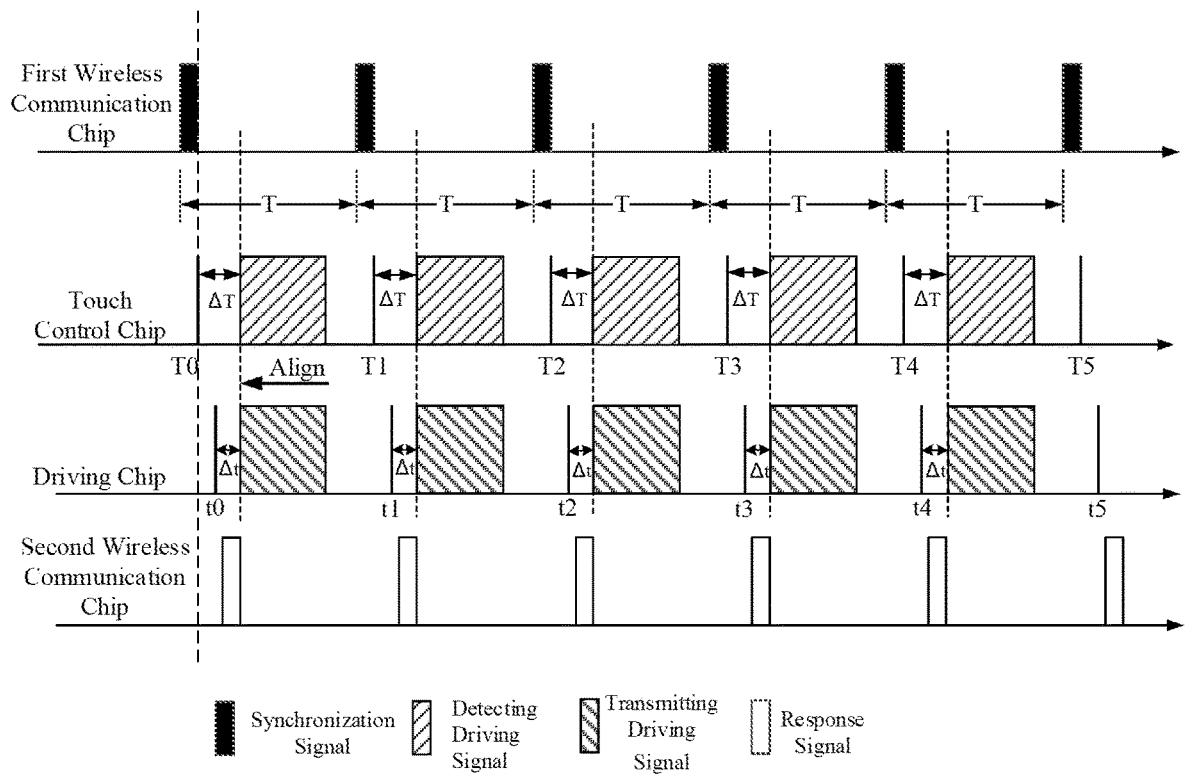
FIG. 4 is a schematic diagram of a time sequence of a signal of a synchronization method according to an embodiment of the present application.

Taking FIG. 4 as an example, a synchronization mode of the present application will be described in detail below. In FIG. 4, a first wireless communication chip of an electronic device periodically transmits a synchronization signal. Every time the first wireless communication chip transmits a synchronization signal, the first wireless communication chip transmits a first indication signal to a touch control chip corresponding to a touch screen, and the touch control chip receives the first indication signal at time T0, T1, T2, T3, T4 and T5, and starts to detect a driving signal transmitted by an active pen after a duration $\Delta T$ starting from the time T0, T1, T2, T3, T4 and T5.

Every time the second wireless communication chip receives the synchronization signal transmitted by the first wireless communication chip, the second wireless communication chip transmits a second indication signal to a driving chip of the active pen. The driving chip receives the second indication signal at time t0, t1, t2, t3, t4 and t5, and starts to transmit the driving signal after a duration $\Delta t$ starting from the time t0, t1, t2, t3, t4 and t5. Due to a wireless transmission delay between the first wireless communication chip and the second wireless communication chip, t0, t1, t2, t3, t4 and t5 are slightly later than T0, T1, T2, T3, T4 and T5, respectively, that is, $\Delta t < \Delta T$. The difference value between $\Delta T$ and $\Delta t$ is related to the first wireless communication chip and the second wireless communication chip per se, and generally, the difference value between ΔT and Δt may be controlled to be substantively unchanged.

In this way, the touch screen and the active pen take the synchronization signal as a starting point, the active pen starts to transmit the driving signal after the duration Δt, and the touch screen starts to detect the driving signal after the duration ΔT, i.e., thus ensuring the synchronization between the touch screen and the active pen. By adopting the synchronization mode of the embodiment of the present application, a synchronization error may be within 30 us, which meets a signal detection requirement between the touch screen and the active pen.

After a wireless connection between the active pen and the electronic device is established, the synchronization may be performed by means of wireless communication. In addition, since wireless communication allows a certain transmission distance, the active pen and the touch screen may perform time-sequence synchronization in advance when the distance thereof is far away, for example, the communication distance of BLE is generally greater than 5 meters. Moreover, the active pen and the touch screen may be automatically adjusted for a long time to always keep in sync. Since the time sequence has been synchronized in advance, whenever the active pen is used for writing, the touch screen may detect the driving signal transmitted by the active pen at the first time, which solves problems of slow synchronization process and short synchronization distance in the existing synchronization mode and greatly improves the response speed of writing with the active pen.

Figure 5:
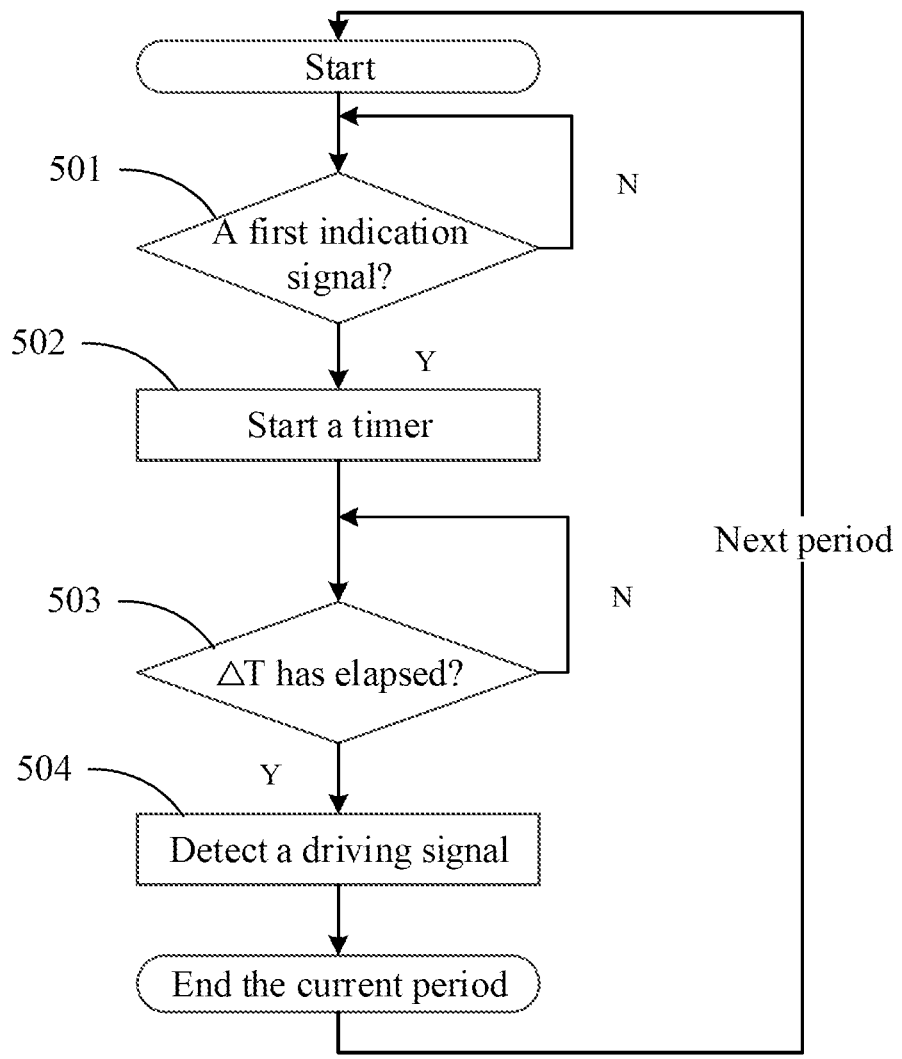
FIG. 5 is a schematic diagram of a possible implementation manner of a touch control chip according to an embodiment of the present application.
Figure 6:
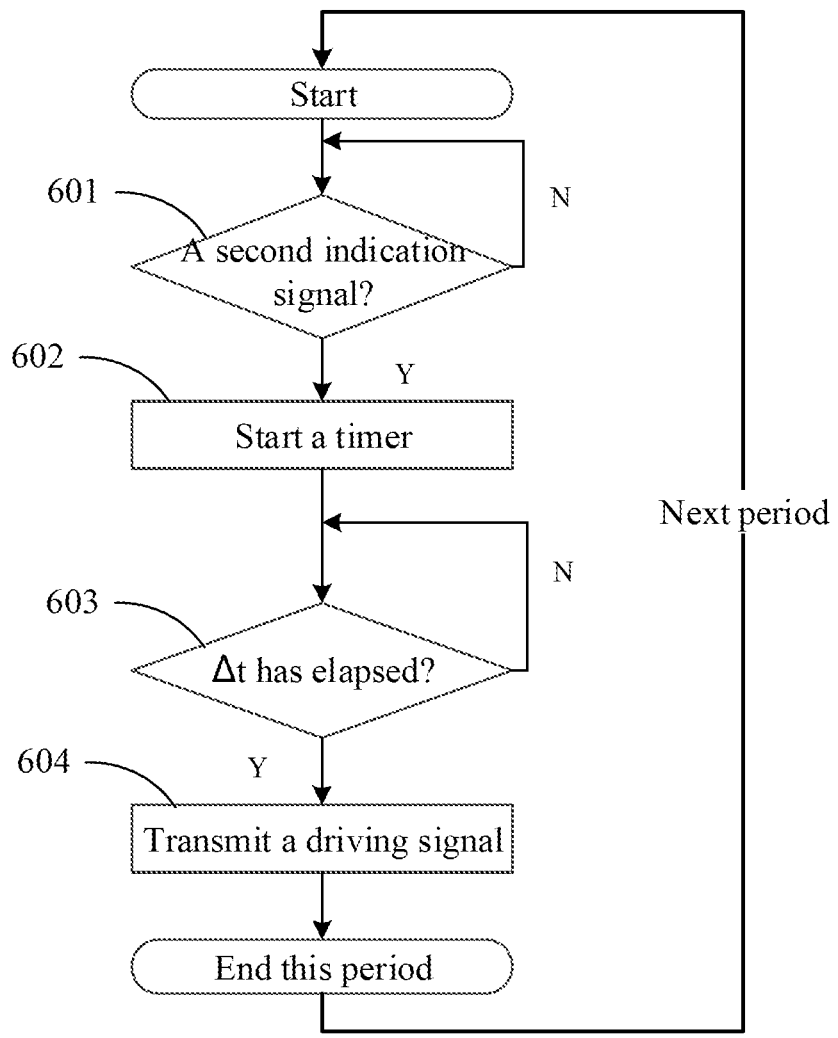
FIG. 6 is a schematic diagram of a possible implementation manner of a driving chip according to an embodiment of the present application.

FIG. 5 and FIG. 6 respectively show a possible implementation manner of a touch control chip and a driving chip.

As shown in FIG. 5, a touch control chip may perform the following steps.

In 501, a touch control chip determines whether a first indication signal is received.

If the first indication signal is received, 502 is executed.

In 502, the touch control chip starts a timer.

A timing duration of the timer is a first preset duration, that is, ΔT shown in FIG. 4. The touch control chip starts the timer at the moment when the first indication signal is received, so as to determine whether the ΔT has been reached by using the timer.

In 503, the touch control chip determines whether ΔT has been reached.

If ΔT has been reached, 504 is executed.

In 504, the touch control chip detects a driving signal.

The touch control chip may obtain the driving signal transmitted by an active pen through a horizontal or vertical detection electrode in a touch screen.

The touch control chip may periodically execute the foregoing process to keep synchronization with the active pen for a long time.

As shown in FIG. 6, a driving chip may perform the following steps.

In 601, a driving chip determines whether a second indication signal is received.

If the second indication signal is received, 602 is executed.

In 602, the driving chip starts a timer.

A timing duration of the timer is a second preset duration, that is, Δt shown in FIG. 4. The driving chip starts the timer at the moment when the second indication signal is received, so as to determine whether the ΔT has been reached by using the timer.

In 603, the driving chip determines whether Δt has been reached.

If Δt has been reached, 604 is executed.

In 604, the driving chip transmits a driving signal.

The driving chip may periodically execute the foregoing process to keep synchronization with the touch screen for a long time.

In an embodiment of the present application, transmitting, by the first wireless communication chip, the first indication signal to the touch control chip may refer to outputting the first indication signal to a pin corresponding to the touch control chip through a pin of the first wireless communication chip. For example, the first wireless communication chip and the touch control chip are connected by pins, and each time the first wireless communication chip transmits the synchronization signal to the second wireless communication chip, a signal is immediately flipped once through the pins to notify the touch control chip.

Similarly, transmitting, by the second wireless communication chip, the second indication signal to the driving chip may refer to outputting the second indication signal to a pin corresponding to the driving chip through a pin of the second wireless communication chip.

It should be noted that due to uncertainty of a time delay of a multitasking operating system, the first wireless communication chip should output the first indication signal to the touch control chip at the first time at the bottom layer of the chip while the first wireless communication chip transmits the synchronization signal, so that the first indication signal is not affected by a response delay of the operating system. For example, the first wireless communication chip may output the first indication signal at the first time during an interrupt processing process at the bottom layer of the chip. Similarly, the second wireless communication chip should also output the second indication signal to the driving chip at the first time at the bottom of the chip while receiving the synchronization signal, so that the second indication signal is not affected by the response delay of the operating system.

The first wireless communication chip and the second wireless communication chip may be, for example, a BLE chip, a WIFI chip, or the like. Considering low power consumption and cost of the BLE chip, the BLE chip may generally be provided in the active pen to perform two-way communication with the BLE chip in the electronic device, so as to realize synchronization.

In the synchronization process between the touch screen and the active pen, the first wireless communication chip may continuously transmit the synchronization signal. In order to reduce power consumption, in an implementation manner, the first wireless communication chip may also start to transmit the synchronization signal when it is determined that the user is ready to use the active pen. For example, the active pen may be fixed on the touch screen through a connector, and a switch circuit may be provided in the connector. When the active pen is fixed on the touch screen, the switch circuit may output an indication signal indicating that the active pen is inserted, and when the active pen leaves the touch screen, the switch circuit may output an indication signal indicating that the active pen is pulled out. Based on the indication signal, the first wireless communication chip may start to transmit the synchronization signal when the active pen is pulled out, and since the user is likely to use the active pen at any time after the active pen is pulled out, synchronization needs to be performed in advance.

It should be understood that the synchronization process described above is that the first wireless communication chip transmits the synchronization signal to the second wireless communication chip for synchronization between the touch screen and the active pen. However, in practical application, the second wireless communication chip may also transmit the synchronization signal to the first wireless communication chip for synchronization between the touch screen and the active pen. For example, the second wireless communication chip transmits a second indication signal to a driving chip while transmitting the synchronization signal to the first wireless communication chip, to instruct the driving chip to transmit a driving signal after a duration $\Delta T$, and the first wireless communication chip transmits a first indication signal to a touch control chip while receiving the synchronization signal, to instruct the touch control chip to detect the driving signal after a duration $\Delta t$, where $\Delta t < \Delta T$.

Figure 7:
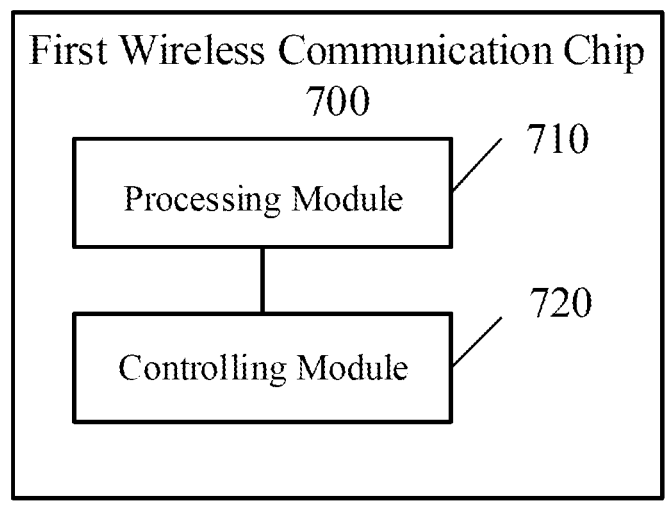
FIG. 7 is a schematic block diagram of a first wireless communication chip according to an embodiment of the present application.

The present application also provides a wireless communication chip, the wireless communication chip is a first wireless communication chip, and the first wireless communication chip is disposed in an electronic device and configured for synchronization between a touch screen of an electronic device and an active pen. As shown in FIG. 7, a first wireless communication chip 700 includes:

a processing module 710, configured to generate a synchronization signal and a first indication signal; and a transmitting module 720, configured to transmit the synchronization signal to a second wireless communication chip of the active pen and simultaneously transmit the first indication signal to a touch control chip of the touch screen;

where the first indication signal is used to instruct the touch control chip to detect a driving signal transmitted by the active pen after a first preset duration starting from reception of the first indication signal, the second wireless communication chip is further configured to transmit a second indication signal to a driving chip of the active pen while receiving the synchronization signal, the second indication signal is used to instruct the driving chip to transmit the driving signal after a second preset duration starting from reception of the second indication signal, the second preset duration is less than the first preset duration, and a difference value between the second preset duration and the first preset duration is within a preset range.

In an implementation manner, the difference value between the second preset duration and the first preset duration is determined based on a wireless transmission delay between the first wireless communication chip and the second wireless communication chip.

In an implementation manner, the preset range is 100 microseconds to 200 microseconds.

In an implementation manner, the chip 700 further includes: a receiving module, configured to receive a response message transmitted by the second wireless communication chip for the synchronization signal.

In an implementation manner, the first wireless communication chip is connected to the touch control chip through pins, and the transmitting module 720 is configured to: output the first indication signal to a pin corresponding to the touch control chip through a pin of the first wireless communication chip.

In an implementation manner, the synchronization signal is transmitted periodically.

In an implementation manner, the first wireless communication chip and the second wireless communication chip are BLE chips.

It should be understood that the receiving module 710 and the transmitting module 720 of the first wireless communication chip 700 are, for example, input and output circuits of the first wireless communication chip 700 or a communication interface of the first wireless communication chip 700. The specific process and produced beneficial effects of the synchronization operation performed by the first wireless communication chip 700 may be referred to the relevant description in the method embodiment, which will not be described here for brevity.

Figure 8:
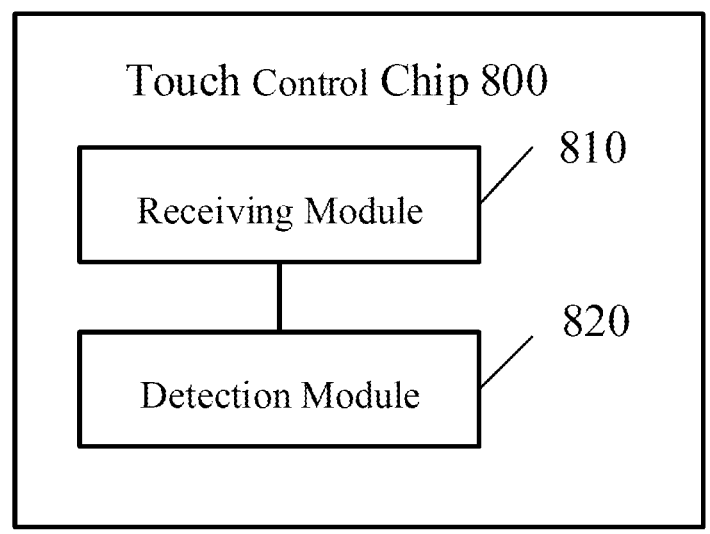
FIG. 8 is a schematic block diagram of a touch control chip according to an embodiment of the present application.

The present application also provides a touch control chip disposed in an electronic device and configured for synchronization between a touch screen of the electronic device and an active pen. As shown in FIG. 8, a touch control chip 800 includes:

a receiving module 810, configured to receive a first indication signal transmitted by a first wireless communication chip of the electronic device, where the first indication signal is transmitted at the same time when the first wireless communication chip transmits a synchronization signal to a second wireless communication chip of the active pen; and a detection module 820, configured to detect a driving signal transmitted by the active pen after a first preset duration starting from reception of the first indication signal by the receiving module 810;

where the second wireless communication chip is further configured to transmit a second indication signal to a driving chip of the active pen while receiving the synchronization signal, the second indication signal is used to instruct the driving chip to transmit the driving signal after a second preset duration starting from reception of the second indication signal, the second preset duration is less than the first preset duration, and a difference value between the second preset duration and the first preset duration is within a preset range.

In an implementation manner, the difference value between the second preset duration and the first preset duration is determined based on a wireless transmission delay between the first wireless communication chip and the second wireless communication chip.

In an implementation manner, the preset range is 100 microseconds to 200 microseconds.

In an implementation manner, the first wireless communication chip is connected to the touch control chip through pins, and the receiving module 810 is configured to: receive the first indication signal output by a pin corresponding to the first wireless communication chip through a pin of the touch control chip.

In an implementation manner, the synchronization signal is transmitted periodically.

In an implementation manner, the first wireless communication chip and the second wireless communication chip are BLE chips.

It should be understood that the receiving module 810 of the touch control chip 800 is, for example, an input circuit of the touch control chip 800 or a communication interface of the touch control chip 800, and the detection module 820 of the touch control chip 800 is, for example, a detection circuit or a processing circuit of the touch control chip 800. The specific process and produced beneficial effects of the synchronization operation performed by the touch control chip 800 may be referred to the relevant description in the method embodiment, which will not be described here for brevity.

Figure 9:
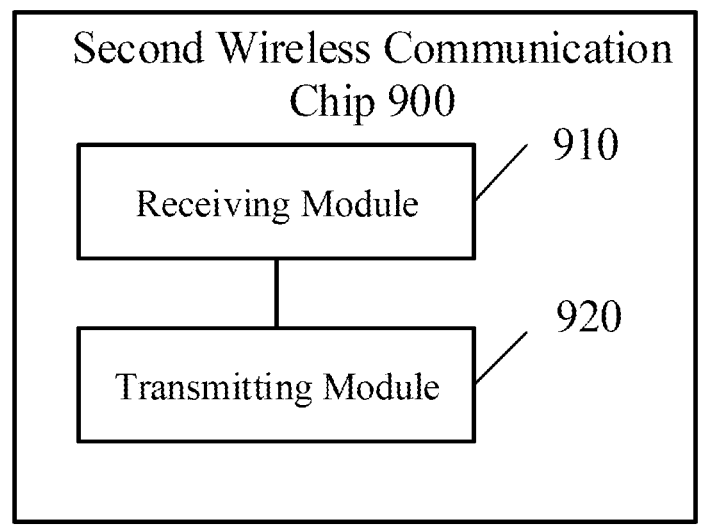
FIG. 9 is a schematic block diagram of a second wireless communication chip according to an embodiment of the present application.

The present application also provides a wireless communication chip, the wireless communication chip is a second wireless communication chip, and the second wireless communication chip is disposed in an active pen and configured for synchronization between a touch screen of an electronic device and the active pen. As shown in FIG. 9, a second wireless communication chip 900 includes:

a receiving module 910, configured to receive a synchronization signal transmitted by a first wireless communication chip of the electronic device; and a transmitting module 920, configured to transmit a second indication signal to a driving chip of the active pen while the receiving module 910 receives the synchronization signal;

where the second indication signal is used to instruct the driving chip to transmit a driving signal after a second preset duration starting from reception of the second indication signal, the first wireless communication chip is further configured to transmit a first indication signal to a touch control chip of the touch screen while transmitting the synchronization signal, the first indication signal is used to instruct the touch control chip to detect the driving signal after a first preset duration starting from reception of the first indication signal, the second preset duration is less than the first preset duration, and a difference value between the second preset duration and the first preset duration is within a preset range.

In an implementation manner, the difference value between the second preset duration and the first preset duration is determined based on a wireless transmission delay between the first wireless communication chip and the second wireless communication chip.

In an implementation manner, the preset range is 100 microseconds to 200 microseconds.

In an implementation manner, the transmitting module 920 is further configured to: transmit, by the second wireless communication chip, a response message for the synchronization signal to the first wireless communication chip while transmitting the second indication signal to the driving chip.

In an implementation manner, the second wireless communication chip is connected to the driving chip through pins, and the transmitting module 920 is configured to: output the second indication signal to a pin corresponding to the driving chip through a pin of the second wireless communication chip.

In an implementation manner, the synchronization signal is transmitted periodically.

In an implementation manner, the first wireless communication chip and the second wireless communication chip are BLE chips.

It should be understood that the receiving module 910 and the transmitting module 920 of the second wireless communication chip 900 are, for example, input and output circuits of the second wireless communication chip 900 or a communication interface of the second wireless communication chip 900. The specific process and produced beneficial effects of the synchronization operation performed by the second wireless communication chip 900 may be referred to the relevant description in the method embodiment, which will not be described here for brevity.

Figure 10:
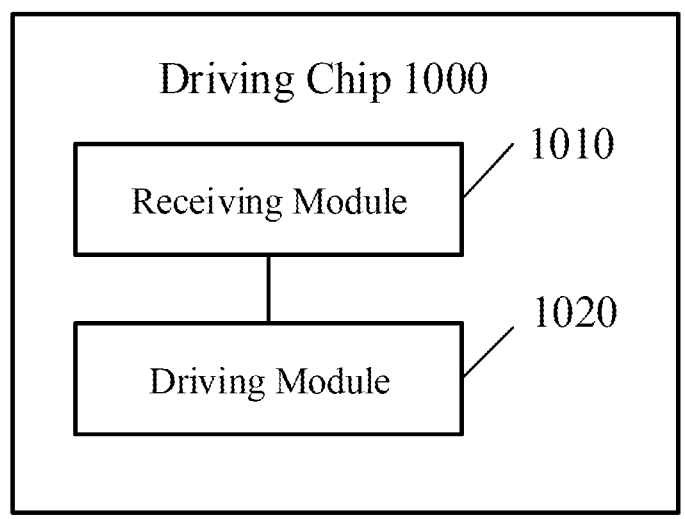
FIG. 10 is a schematic block diagram of a driving chip according to an embodiment of the present application.

The present application also provides a driving chip disposed in an active pen and configured for synchronization between a touch screen of an electronic device and the active pen. As shown in FIG. 10, a driving chip 1000 includes:

a receiving module 1010, configured to receive a second indication signal transmitted by a second wireless communication chip of the active pen, where the second indication signal is transmitted at the same time when the second wireless communication chip receives a synchronization signal transmitted by the first wireless communication chip; and a driving module 1020, configured to transmit a driving signal after a second preset duration starting from reception of the second indication signal;

where the first wireless communication chip is further configured to transmit a first indication signal to a touch control chip of the touch screen while transmitting the synchronization signal, the first indication signal is used to instruct the touch control chip to detect the driving signal after a first preset duration starting from reception of the first indication signal, the second preset duration is less than the first preset duration, and a difference value between the second preset duration and the first preset duration is within a preset range.

In an implementation manner, the difference value between the second preset duration and the first preset duration is determined based on a wireless transmission delay between the first wireless communication chip and the second wireless communication chip.

In an implementation manner, the preset range is 100 microseconds to 200 microseconds.

In an implementation manner, the second wireless communication chip is connected to the driving chip through pins, and the receiving module 1010 is configured to: receive the second indication signal output by a pin corresponding to the second wireless communication chip through a pin of the driving chip.

In an implementation manner, the synchronization signal is transmitted periodically.

In an implementation manner, the first wireless communication chip and the second wireless communication chip are BLE chips.

The present application also provides an electronic device, including the first wireless communication chip 700 shown in FIG. 7; and the touch control chip 800 shown in FIG. 8.

The present application also provides an active pen, including the second wireless communication chip 900 shown in FIG. 9; and the driving chip 1000 shown in FIG. 10.

It should be understood that the receiving module 1010 and the driving module 1020 of the driving chip 1000 are, for example, input and output circuits of the driving chip 1000 or a communication interface of the driving chip 1000. The specific process and produced beneficial effects of the synchronization operation performed by the driving chip 1000 may be referred to the relevant description in the method embodiment, which will not be described here for brevity.

It should be noted that, in a case of no conflict, various embodiments and/or the technical features in the various embodiments described in the present application may be combined with each other arbitrarily, and the technical solutions obtained after the combination should also fall within the protection scope of the present application.

The system, apparatus, and method disclosed in the embodiments of the present application may be implemented in other manners. For example, some features of the method embodiments described above may be ignored or not performed. The apparatus embodiments described above are merely exemplary, the division of units is merely a logic function division, other division manners may exist in practical implementation, and a plurality of units or components may be combined or integrated to another system. In addition, couplings between units or components may be direct couplings or indirect couplings, the foregoing couplings include electrical, mechanical or other forms of connections.

It may be clearly understood by a person skilled in the art that, for ease and brief description, a detailed working process and produced technical effect of the foregoing apparatus and devices may refer to a corresponding process and produced technical effect in the foregoing method embodiments, which will not be described here for brevity.

It should be noted that specific examples in the embodiments of the present application are merely intended to help a person skilled in the art better understand the embodiments of the present application, rather than for limiting the scope of the present application. A person skilled in the art can make various improvements and modifications on the basis of the foregoing embodiments, and these improvements or modifications fall within the protection scope of the present application.

The foregoing descriptions are merely specific implementation manners of the present application. However, the protection scope of the present application is not limited thereto, and persons skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A synchronization method, wherein the method is used for synchronization between a touch screen of an electronic device and an active pen, and the method comprises:
    transmitting, by a first wireless communication chip of the electronic device, a synchronization signal to a second wireless communication chip of the active pen and simultaneously transmitting a first indication signal to a touch control chip of the touch screen;
    wherein the first indication signal is used to instruct the touch control chip to detect a driving signal transmitted by the active pen after a first preset duration starting from reception of the first indication signal, the second wireless communication chip is further configured to transmit a second indication signal to a driving chip of the active pen while receiving the synchronization signal, the second indication signal is used to instruct the driving chip to transmit the driving signal after a second preset duration starting from reception of the second indication signal, the second preset duration is less than the first preset duration, and a difference value between the second preset duration and the first preset duration is within a preset range.

2. The method according to claim 1, wherein the difference value between the second preset duration and the first preset duration is determined based on a wireless transmission delay between the first wireless communication chip and the second wireless communication chip.

3. The method according to claim 2, wherein the preset range is 100 microseconds to 200 microseconds.

4. The method according to claim 1, wherein the method further comprises:
    receiving, by the first wireless communication chip, a response message transmitted by the second wireless communication chip for the synchronization signal.

5. The method according to claim 1, wherein the first wireless communication chip is connected to the touch control chip through pins, and the transmitting, by the first wireless communication chip, the first indication signal to the touch control chip of the touch screen comprises:
    outputting, by the first wireless communication chip, the first indication signal to a pin corresponding to the touch control chip through a pin of the first wireless communication chip.

6. The method according to claim 1, wherein the synchronization signal is transmitted periodically.

7. The method according to claim 1, wherein the first wireless communication chip and the second wireless communication chip are Bluetooth low energy (BLE) chips.

8. A synchronization method, wherein the method is used for synchronization between a touch screen of an electronic device and an active pen, and the method comprises:
    receiving, by a touch control chip of the touch screen, a first indication signal transmitted by a first wireless communication chip of the electronic device, wherein the first indication signal is transmitted at the same time when the first wireless communication chip transmits a synchronization signal to a second wireless communication chip of the active pen; and
    detecting, by the touch control chip, a driving signal transmitted by the active pen after a first preset duration starting from reception of the first indication signal;
    wherein the second wireless communication chip is further configured to transmit a second indication signal to a driving chip of the active pen while receiving the synchronization signal, the second indication signal is used to instruct the driving chip to transmit the driving signal after a second preset duration starting from reception of the second indication signal, the second preset duration is less than the first preset duration, and a difference value between the second preset duration and the first preset duration is within a preset range.

9. The method according to claim 8, wherein the difference value between the second preset duration and the first preset duration is determined based on a wireless transmission delay between the first wireless communication chip and the second wireless communication chip.

10. The method according to claim 9, wherein the preset range is 100 microseconds to 200 microseconds.

11. The method according to claim 8, wherein the first wireless communication chip is connected to the touch control chip through pins, and the receiving, by the touch control chip of the touch screen, the first indication signal transmitted by the first wireless communication chip of the electronic device comprises:
    receiving, by the touch control chip, the first indication signal output by a pin corresponding to the first wireless communication chip through a pin of the touch control chip.

12. The method according to claim 8, wherein the synchronization signal is transmitted periodically.

13. The method according to claim 8, wherein the first wireless communication chip and the second wireless communication chip are Bluetooth low energy (BLE) chips.

14. A synchronization method, wherein the method is used for synchronization between a touch screen of an electronic device and an active pen, and the method comprises:
    receiving, by a driving chip of the active pen, a second indication signal transmitted by a second wireless communication chip of the active pen, wherein the second indication signal is transmitted at the same time when the second wireless communication chip receives a synchronization signal transmitted by a first wireless communication chip of the electronic device; and transmitting, by the driving chip, a driving signal after a second preset duration starting from reception of the second indication signal;

wherein the first wireless communication chip is further configured to transmit a first indication signal to a touch control chip of the touch screen while transmitting the synchronization signal, the first indication signal is used to instruct the touch control chip to detect the driving signal after a first preset duration starting from reception of the first indication signal, the second preset duration is less than the first preset duration, and a difference value between the second preset duration and the first preset duration is within a preset range.

15. The method according to claim 14, wherein the difference value between the second preset duration and the first preset duration is determined based on a wireless transmission delay between the first wireless communication chip and the second wireless communication chip.

16. The method according to claim 15, wherein the preset range is 100 microseconds to 200 microseconds.

17. The method according to claim 14, wherein the second wireless communication chip is connected to the driving chip through pins, and the receiving, by the driving chip of the active pen, the second indication signal transmitted by the second wireless communication chip of the active pen comprises:

receiving, by the driving chip, the second indication signal output by a pin corresponding to the second wireless communication chip through a pin of the driving chip.

18. The method according to claim 14, wherein the synchronization signal is transmitted periodically.

19. The method according to claim 14, wherein the first wireless communication chip and the second wireless communication chip are Bluetooth low energy (BLE) chips.

* * * * *